US010810226B2

(12) United States Patent
Xue et al.

(10) Patent No.: US 10,810,226 B2
(45) Date of Patent: Oct. 20, 2020

(54) SHARED COMMENTS FOR VISUALIZED DATA

(71) Applicant: Business Objects Software Limited, Dublin (IE)

(72) Inventors: Xiaohui Xue, Courbevoie (FR); Peter Snowdon, Paris (FR); Kevin Le Fur, Paris (FR)

(73) Assignee: BUSINESS OBJECTS SOFTWARE LIMITED, Dublin (IE)

( * ) Notice: Subject to any disclaimer, the term of this patent is extended or adjusted under 35 U.S.C. 154(b) by 257 days.

(21) Appl. No.: 15/342,315

(22) Filed: Nov. 3, 2016

(65) Prior Publication Data

US 2018/0123995 A1    May 3, 2018

(51) Int. Cl.
*G06F 16/248*  (2019.01)
*G06F 16/26*  (2019.01)
*G06F 16/2457*  (2019.01)
*G06F 16/2458*  (2019.01)

(52) U.S. Cl.
CPC .......... *G06F 16/26* (2019.01); *G06F 16/248* (2019.01); *G06F 16/2465* (2019.01); *G06F 16/24573* (2019.01)

(58) Field of Classification Search
CPC ......... G06F 17/30241; G06F 17/30014; G06F 17/30038
See application file for complete search history.

(56) References Cited

U.S. PATENT DOCUMENTS

| 2006/0122465 | A1* | 6/2006 | Bastien .................. G16H 10/20 600/300 |
| 2014/0032616 | A1* | 1/2014 | Nack ...................... G06F 17/241 707/805 |
| 2014/0143735 | A1* | 5/2014 | Dahn ................. G06Q 10/0637 715/853 |
| 2014/0281890 | A1* | 9/2014 | D'Angelo ........... G06F 17/2247 715/234 |
| 2017/0004182 | A1* | 1/2017 | Simpson ............... H04L 67/306 |
| 2017/0255605 | A1* | 9/2017 | Kehl ..................... G06T 11/206 |

\* cited by examiner

*Primary Examiner* — James Trujillo
*Assistant Examiner* — J Mitchell Curran
(74) *Attorney, Agent, or Firm* — Buckley, Maschoff & Talwalkar LLC

(57) ABSTRACT

A system includes presentation of a visualization of a result set, the visualization including a plurality of graphical representations, each of the plurality of graphical representations associated with a respective data point comprising at least one dimension value and at least one measure of the result set, reception of a selection of a first data point of the plurality of data points, presentation of an interface to receive a one or more comments in response to selection of the first data point, reception of a first one or more comments, and storage, in response to reception of the first one or more comments, of an identifier of the first data point in association with the first one or more comments.

21 Claims, 11 Drawing Sheets

US 10,810,226 B2

SHARED COMMENTS FOR VISUALIZED DATA

BACKGROUND

Enterprise software systems receive, generate, and store data related to many aspects of an enterprise. Users operate reporting tools to access such data and display the data in useful formats, such as in graphic visualizations.

Some conventional reporting tools receive user-submitted queries (e.g., Sales by Country), and present a visualization (e.g., a bar graph, a pie chart, a geomap) of a corresponding result set. A user may wish to annotate the visualization with respect to particular data of the result set. Systems to facilitate and persist such annotations are desired. System to share such annotations among users are also desired.

DETAILED DESCRIPTION

The following description is provided to enable any person in the art to make and use the described embodiments. Various modifications, however, will remain readily apparent to those in the art.

Generally, some embodiments allow a user to view a result set visualization and input a comment associated with a data point presented in the visualization. The comment is persisted and may be available to other users viewing the same data point in a subsequently-presented visualization.

Figure 1:
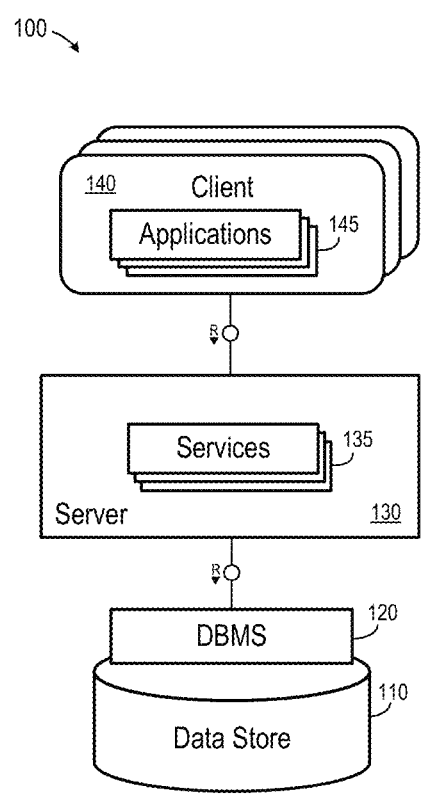
FIG. 1 is a block diagram of a system architecture according to some embodiments.

FIG. 1 is a block diagram of architecture 100 according to some embodiments. Embodiments are not limited to architecture 100 or to a database architecture.

Architecture 100 includes data store 110, database management system (DBMS) 120, server 130, services 135, clients 140 and applications 145. Generally, services 135 executing within server 130 receive requests from applications 145 executing on clients 140 and provides results to applications 145 based on data stored within data store 110.

More specifically, server 130 may execute and provide services 135 to applications 145. Services 135 may comprise server-side executable program code (e.g., compiled code, scripts, etc.) which provide functionality to applications 145 by providing user interfaces to clients 140, receiving requests from applications 145, retrieving data from data store 110 based on the requests, processing the data received from data store 110, and providing the processed data to applications 145. Services 135 may be made available for execution by server 130 via registration and/or other procedures which are known in the art.

In one specific example, a client 140 executes an application 145 to present a user interface to a user on a display of the client 140. The user enters a query into the user interface and the application 145 passes a request based on the query to one of services 135. An SQL script is generated based on the request and forwarded to DBMS 120. DBMS 120 executes the SQL script to return a result set based on data of data store 110, and the application 145 creates and presents a visualization based on the result set.

As will be described below, the visualization may include one or more identifiers of user comments which are associated with data depicted in the visualization. A user may interact with application 145 to submit a new comment associated with depicted data.

Server 130 provides any suitable protocol interfaces through which applications 145 executing on clients 140 may communicate with services 135 executing on application server 130. For example, server 130 may include a HyperText Transfer Protocol (HTTP) interface supporting a transient request/response protocol over Transmission Control Protocol (TCP), and/or a WebSocket interface supporting non-transient full-duplex communications between server 130 and any clients 140 which implement the WebSocket protocol over a single TCP connection.

One or more services 135 executing on server 130 may communicate with DBMS 120 using database management interfaces such as, but not limited to, Open Database Connectivity (ODBC) and Java Database Connectivity (JDBC) interfaces. These types of services 135 may use Structured Query Language (SQL) to manage and query data stored in data store 110.

DBMS 120 serves requests to query, retrieve, create, modify (update), and/or delete data of data store 110, and also performs administrative and management functions. Such functions may include snapshot and backup management, indexing, optimization, garbage collection, and/or any other database functions that are or become known. DBMS 120 may also provide application logic, such as database procedures and/or calculations, according to some embodiments. This application logic may comprise scripts, functional libraries and/or compiled program code.

Server 130 may be separated from or closely integrated with DBMS 120. A closely-integrated server 130 may enable execution of services 135 completely on the database platform, without the need for an additional server. For example, according to some embodiments, server 130 provides a comprehensive set of embedded services which provide end-to-end support for Web-based applications. The services may include a lightweight web server, configurable support for Open Data Protocol, server-side JavaScript execution and access to SQL and SQLScript.

Server 130 may provide application services (e.g., via functional libraries) using which services 135 may manage and query the data of data store 110. The application services can be used to expose the database data model, with its tables, views and database procedures, to clients 140. In addition to exposing the data model, server 130 may host system services such as a search service.

Data store 110 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Data store 110 may also store metadata defining objects which are mapped to logical entities of data store 110. Each object associates one or more physical entities (e.g., a physical database table, associated columns of one or more database tables, etc.) of one or more enterprise data sources with user-friendly names. These objects may be classified as dimensions, along which one may want to perform an analysis or report (e.g., Year, Country, Product) or measures (e.g., Sales, Profit), whose values can be determined for a given combination of dimension values. Accordingly, a query received from one of clients 140 may comprise a combination of one or more measures, dimensions, dimension values and/or filters.

According to some embodiments, and as will be described in detail below, data store may contain user comments associated with particular data points. A comment may be received from a user via a user interface presenting a visualization and may be stored in conjunction with metadata defining the data point with which the comments are associated. The stored information may be used to identify comments associated with data points to be presented in subsequent visualizations, allowing those comments to be presented or otherwise identified in the subsequent visualizations.

Data store 110 may comprise any query-responsive data source or sources that are or become known, including but not limited to a structured-query language (SQL) relational database management system. Data store 110 may comprise a relational database, a multi-dimensional database, an eXtendable Markup Language (XML) document, or any other data storage system storing structured and/or unstructured data. The data of data store 110 may be distributed among several relational databases, dimensional databases, and/or other data sources. Embodiments are not limited to any number or types of data sources.

In some embodiments, the data of data store 110 may comprise one or more of conventional tabular data, row-based data, column-based data, and object-based data. Moreover, the data may be indexed and/or selectively replicated in an index to allow fast searching and retrieval thereof. Data store 110 may support multi-tenancy to separately support multiple unrelated clients by providing multiple logical database systems which are programmatically isolated from one another.

Each of clients 140 may comprise one or more devices executing program code of an application 145 for presenting user interfaces to allow interaction with application server 130. The user interfaces of applications 145 may comprise user interfaces suited for reporting, data analysis, and/or any other functions based on the data of data store 110.

Presentation of a user interface as described herein may comprise any degree or type of rendering, depending on the type of user interface code generated by server 130. For example, a client 140 may execute a Web Browser to request and receive a Web page (e.g., in HTML format) from application server 130 via HTTP, HTTPS, and/or WebSocket, and may render and present the Web page according to known protocols. One or more of clients 140 may also or alternatively present user interfaces by executing a stand-alone executable file (e.g., an .exe file) or code (e.g., a JAVA applet) within a virtual machine. In another method, one or more of clients 140 execute applications 145 loaded from server 130, that receive data and metadata by requests to services 135 executed on the server 130. Data and metadata is processed by the applications 145 to render the user interface on the client 140.

Figure 2:
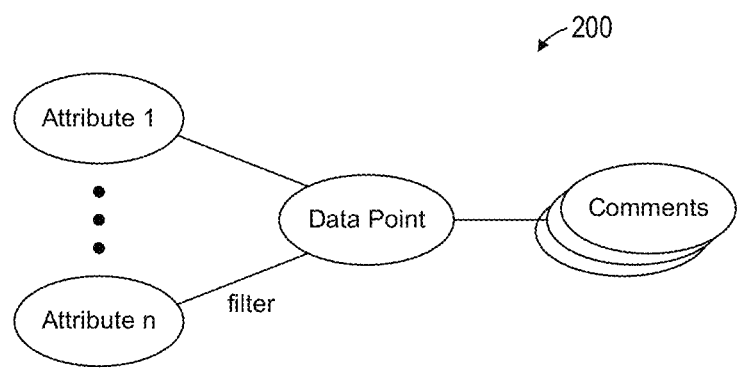
FIG. 2 is a model of a data structure to store comments according to some embodiments.

FIG. 2 illustrates logical representation 200 of a data structure to persist comments in association with a data point according to some embodiments. Representation 200 defines a data point as a set of attributes, which may consist of attributes and/or dimensions. If an attribute is a dimension (e.g., Country), its dimension value (e.g., France) is also stored, as denoted by "filter" in FIG. 2. All comments associated with a particular data point are stored together according to some embodiments. Logical representation 200 may be implemented using any type of physical data structure that is or becomes known, including but not limited to one or more relational database tables.

Figure 3:
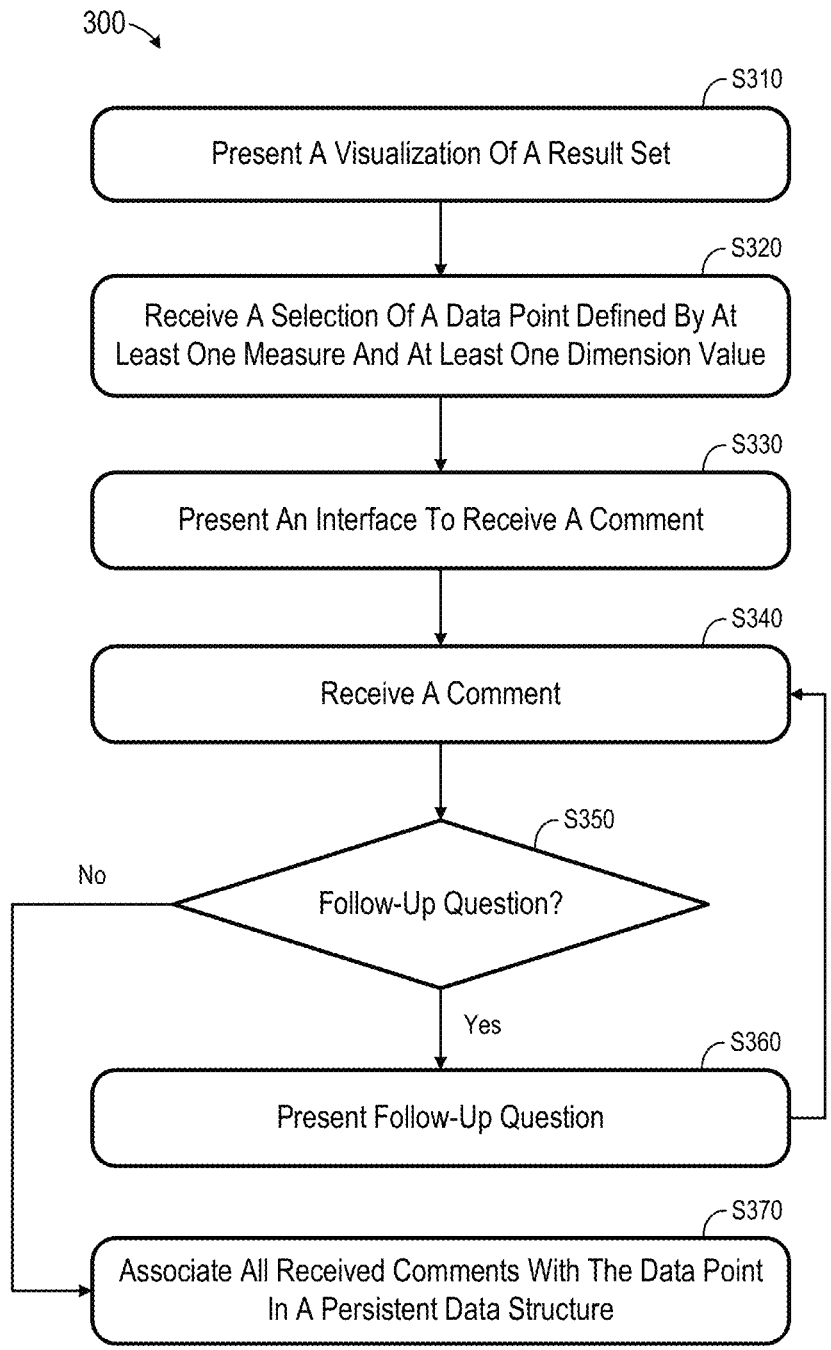
FIG. 3 comprises a flow diagram of a process according to some embodiments.

FIG. 3 comprises a flow diagram of process 300 according to some embodiments. Process 300 may be executed to receive comments associated with a data point presented in a visualization. In some embodiments, various hardware elements of system 100 execute program code to perform process 300.

Process 300 and all other processes mentioned herein may be embodied in computer-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Prior to process 300, a user submits a query in order to request a result set of data. The query may comprise at least one measure or dimension. As described above, and according to some embodiments, server 130 may receive the query, generate an SQL script based on the query and on the metadata defining the dimensions and measures of the query, and forward the script to DBMS 120. DBMS 120 executes the SQL script to return a corresponding result set to an application 145 based on data of data store 110, and the application 145 creates and presents a visualization of the result set at S310.

Figure 4:
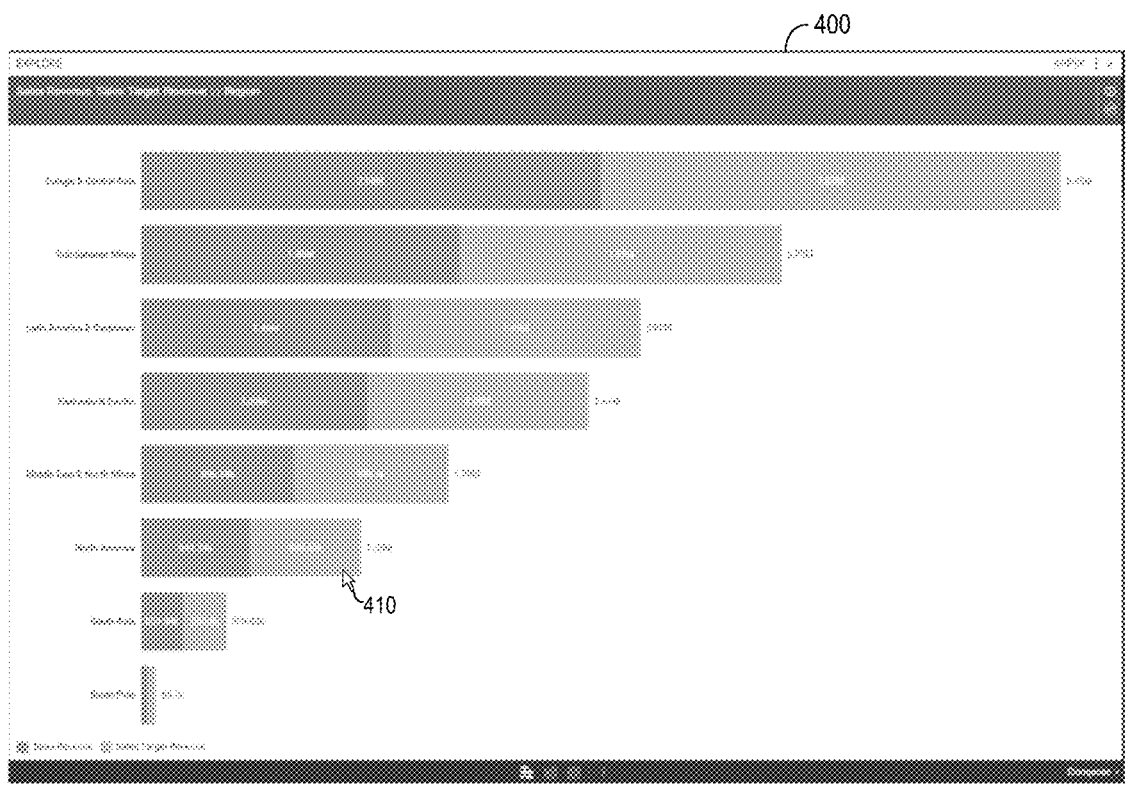
FIG. 4 is an outward view of a user interface presenting a visualization according to some embodiments.

FIG. 4 illustrates interface 400 presenting a visualization at S310 according to some embodiments. As shown, a user has entered the query "Sales Revenue, Sales Target Revenue by Region". The visualization comprises a bar graph showing sales revenue and sales target revenue for each of several regions. The visualization may be generated using any suitable system for producing a visualization of a result set of data based on a query. Interface 400 may comprise a Web page provided by server 130 in response to a request from a Web browser application 145 executing on client 140. Any client application 145 may be used to display interface 400, which is not limited to Web-based formats.

Next, at S320, a selection of a data point is received. The data point is defined by at least one measure and at least one dimension value over which the measure is aggregated. As shown in FIG. 4, the user selects the data point Sales Target Revenue (i.e., a measure) for North America (i.e., a dimension value) by moving by cursor 410 over the graphical portion of the visualization which represents the data point and selecting the data point via clicking a mouse button. Any user interface paradigm for selecting a data point may be employed at S320 according to some embodiments. For example, the user may select the data point from a drop-down list of measure values and corresponding dimension values.

Figure 5:
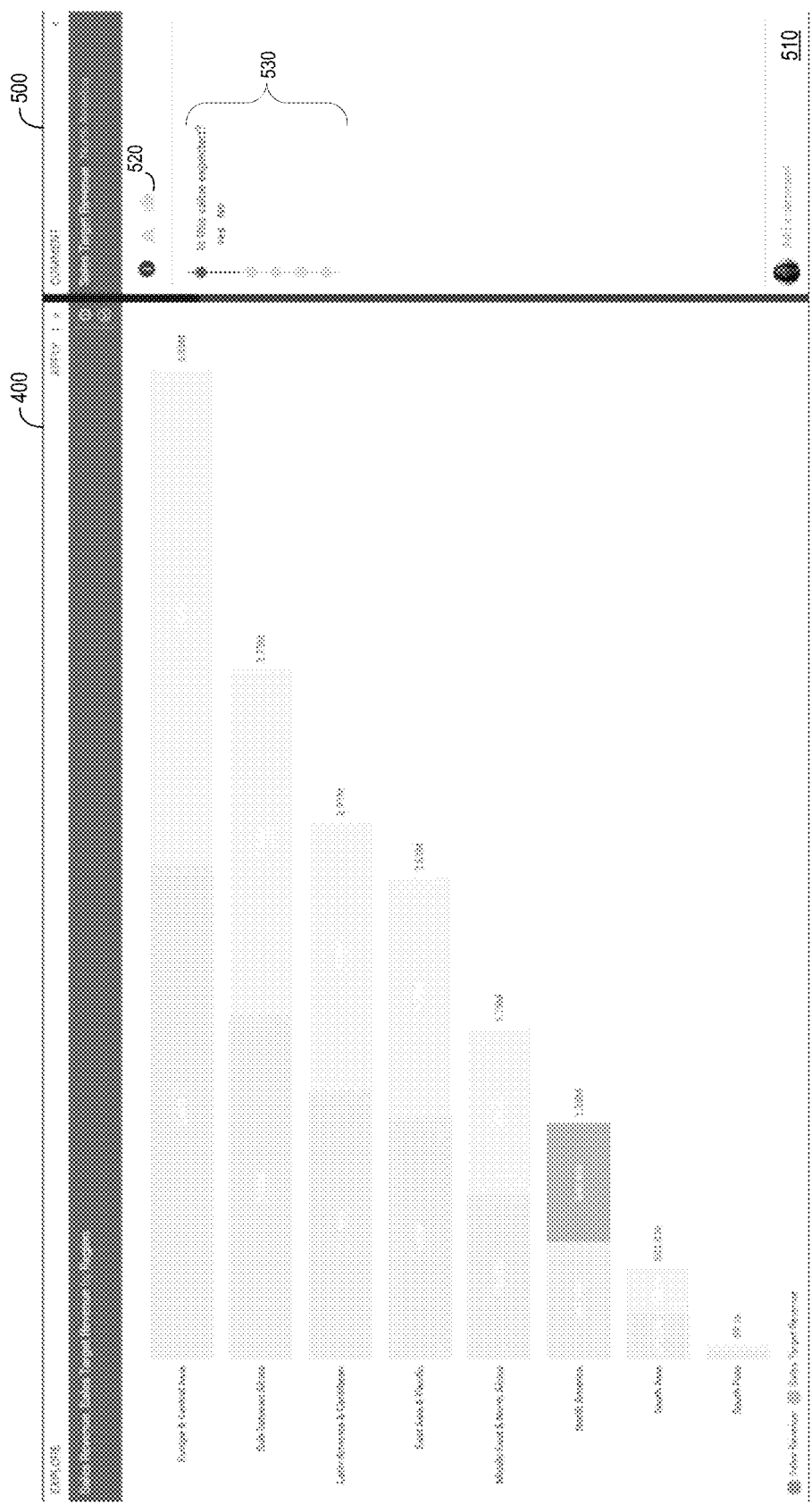
FIG. 5 is an outward view of a user interface presenting a visualization and for receiving comments according to some embodiments.

In response to the selection, an interface to receive a comment associated with the data point is presented at S330. FIG. 5 shows comment panel 500 to receive a comment associated with the selected data point according to some embodiments. Comment panel 500 includes comment field 510 into which the user may enter text. Panel 500 also includes icons 520 for tagging the comment with a comment type of "Information", "Alert" or "Like".

In the illustrated embodiment, panel 500 also includes question set 530. Question set 530 provides questions, or prompts, which the user may answer in order to generate a comment which will be potentially more useful to other users, and which includes semantic information that may be used by system 100 to filter, organize, prioritize and/or control display of the comment.

Figure 6:
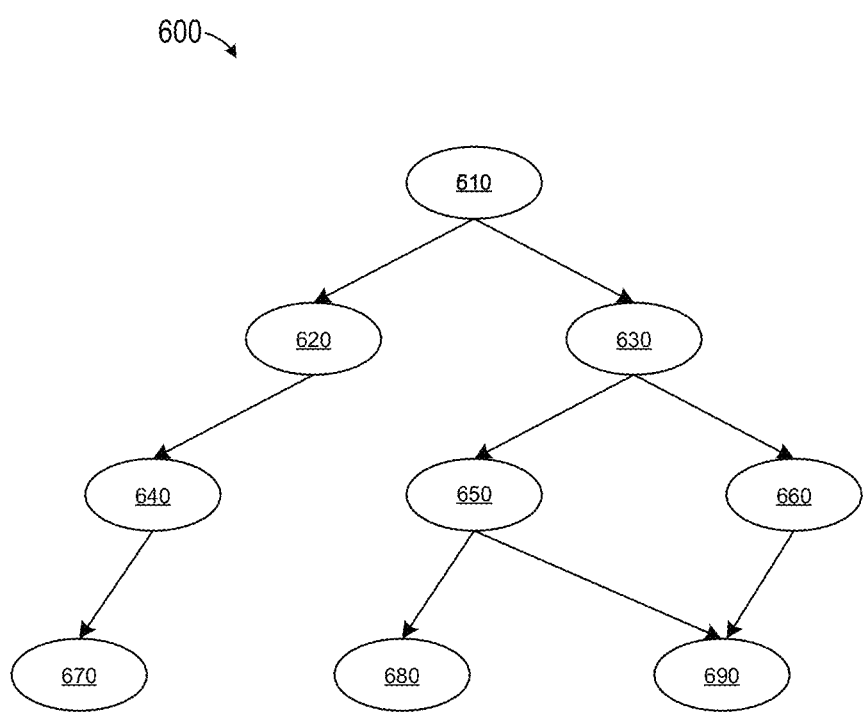
FIG. 6 illustrates a decision tree of follow-up questions according to some embodiments.

Only one question of question set 530 is initially displayed because, according to the illustrated embodiment, the content of the subsequent questions of question set 530 depends upon the answers provided to preceding questions. In this regard, question set 530 may be determined based on stored data representing a question tree, such as question tree 600 of FIG. 6.

Question tree 600 includes several levels of nodes 610-690, each of which represents a question to ask a user. Node 610 represents an initial question presented to the user (e.g., "Is this value expected?"), and nodes 620 and 630 represent questions which may be alternatively presented based on the answer to the initial question. The answer to the specific question may be one of two alternatives, one of many alternatives, many of many alternatives, a value, or any other type of answer which may be evaluated to determine a next question to present.

Embodiments are not limited to two child nodes (i.e., two potential follow-up questions) per parent node. Some nodes (e.g., nodes 620, 640 and 660) of tree 600 have only one child node, so the question of the child node is presented regardless of the answer to the question of its parent node. Also, a node (e.g., node 690) may have more than one parent node, thereby providing more than one path through question tree 600 to the node.

Embodiments may employ different decision trees for different users and/or types of data points. Each node of tree 600 may specify a question as well as semantic information to describe potential answers to its question. For example, one node may be associated with the question "Is this value higher than expected?" and with data indicating that the answer "Yes" indicates a good value and that the answer "No" indicates a poor value. Another node (of a same or different question tree) may also be associated with the question "Is this value higher than expected?" but with data indicating that the answer "Yes" indicates a poor value and that the answer "No" indicates a good value.

Figure 7:
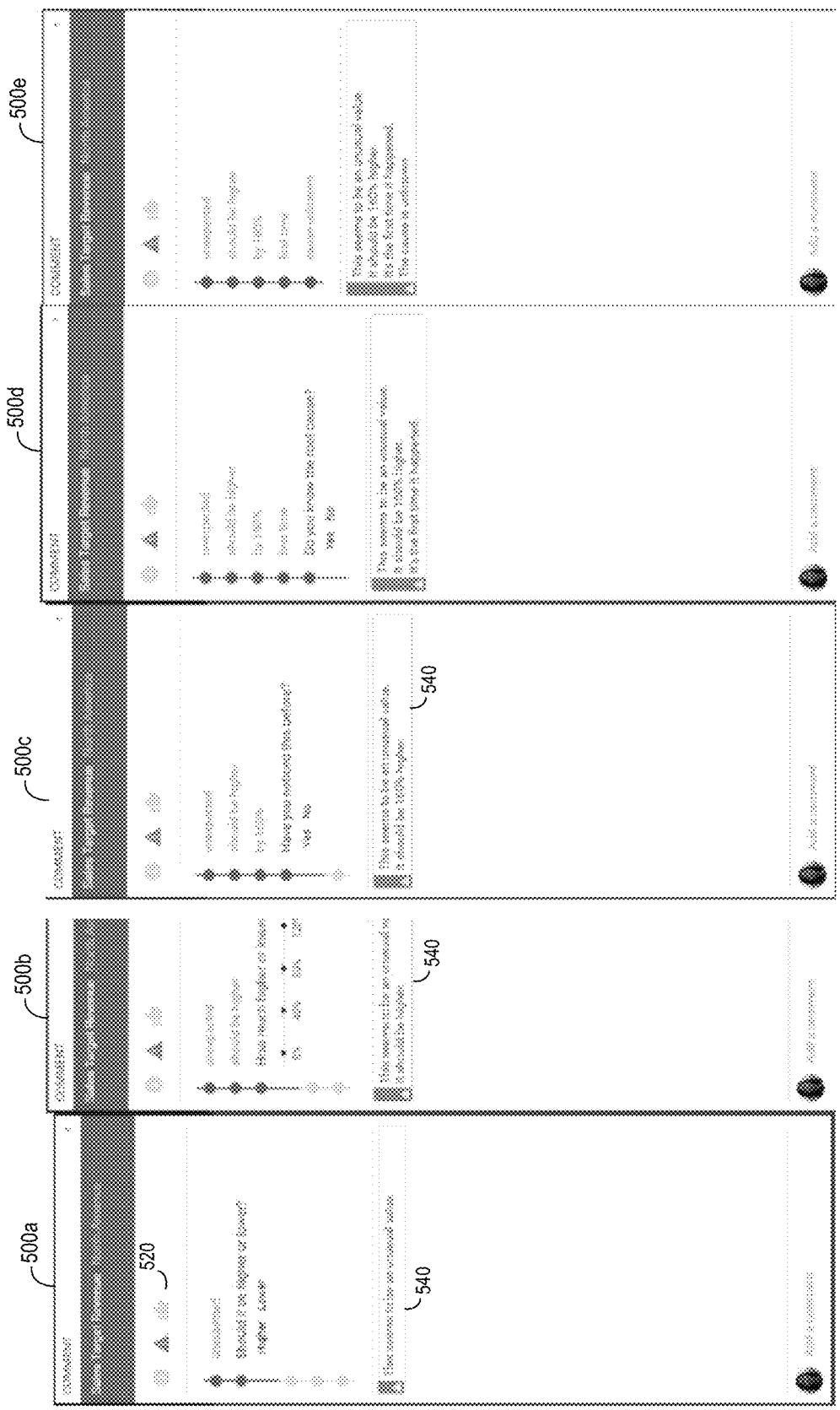
FIG. 7 comprises five outward views of a user interface for receiving comments according to some embodiments.

It will be assumed that the user selects "Yes" in question set 530 at S340. Next, at S350, it is determined whether a follow-up question should be asked. The determination at S350 may be based on a question tree used to determine question set 530. In the present example the determination at S350 is affirmative, so flow proceeds to S360 to present a follow-up question and returns to S340 to receive a comment (i.e., an answer) in response. FIG. 7 shows panel 500a through 500e as flow cycles through S340, S350 and S360 to present four questions and receive four answers according to a stored question tree.

As shown in panel 500a, the initial answer of "Yes" results in setting of alert icon 520. This action may be defined by the node of the question tree which defines the initial question "Is this value expected?". The node may also define the comment text 540 which is generated based on the answer to the initial question. As also shown in panels 500b-500e, comment text 540 is updated based on each subsequently-provided answer. Again, these text updates may be specified by the nodes which define the corresponding questions.

Figure 8:
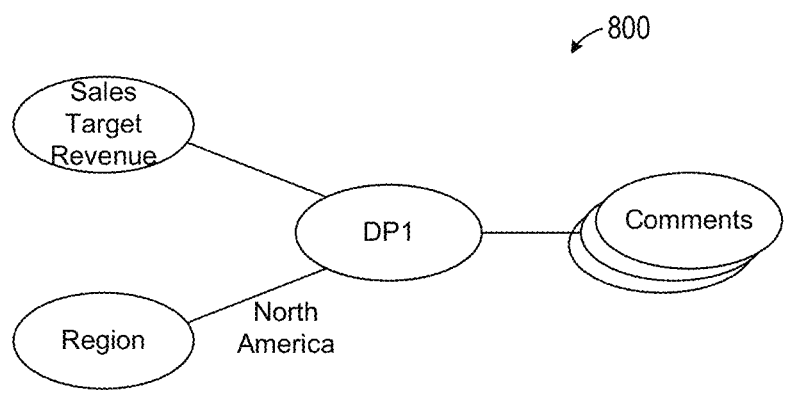
FIG. 8 is a model of an instance of a data structure to store comments according to some embodiments.
Figure 9:
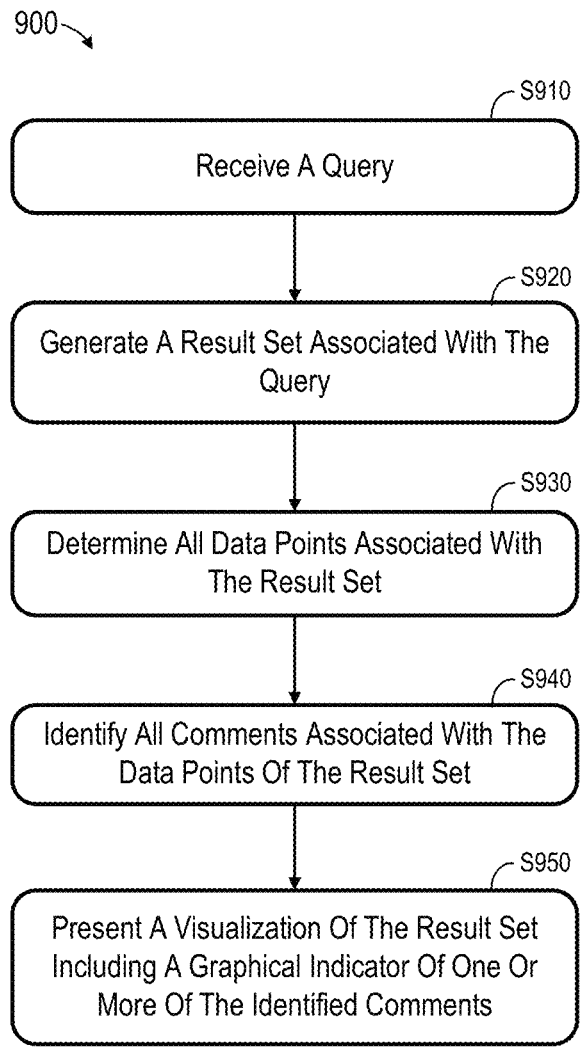
FIG. 9 comprises a flow diagram of a process according to some embodiments.

Flow proceeds from S350 to S370 once it is determined that no follow-up questions remain (e.g., the end of a question tree has been reached). At S370, all received comments are associated with the data point in a persisted data structure. FIG. 8 illustrates instance 800 of the logical model of FIG. 2 according to the present example. The attributes of the data point DP1 are Sales Target Revenue and Region:North America. The comments associated with the data point may be the answers to each question of the question set, any semantic information associated with those answers, comment text generated based on the answers, as well any text entered into field 510.

Association of the comments with the data point at S370 may include searching the persisted storage for a data structure already associated the data point. For example, it is determined whether a data point structure having identical attributes to the selected data point already exists. If such a stored data structure already exists, the newly-received comments are associated with the existing data structure. If a data point structure having identical attributes to the selected data point does not exist, the structure is created and stored. As described with respect to FIG. 2, any type of persisted data structure may be employed to implement instances such as instance 800.

Figure 10:
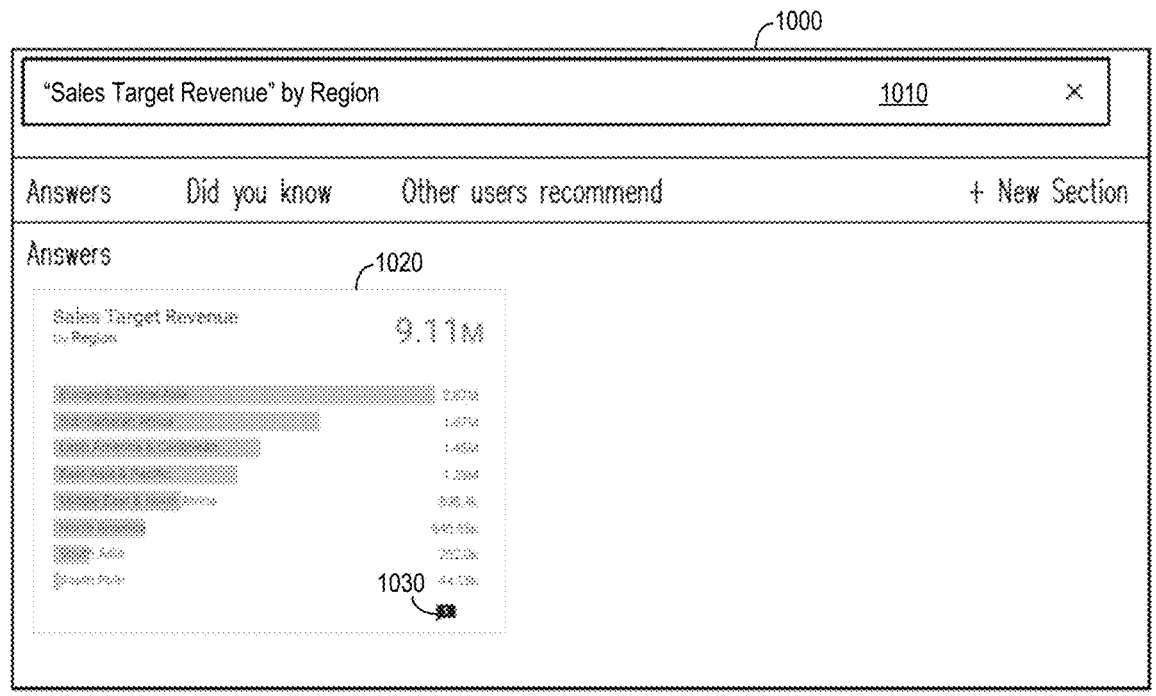
FIG. 10 is an outward view of a user interface according to some embodiments

Process 900 may be executed to consume persisted comments according to some embodiments. A query is initially received from a user at S910. FIG. 10 illustrates interface 1000 to receive a query at S910 according to some embodiments. As shown, a user has entered the query "Sales Target Revenue by Region" into field 1010.

A result set is generated based on the received query at S920. The result set may be generated as is known in the art. For example, an SQL script is generated based on the query and on metadata defining the dimensions and measures of the query, the script is forwarded to DBMS 120, and DBMS 120 executes the SQL script to return a corresponding result set based on data of data store 110.

Next, all data points associated with the result set are determined at S930. With respect to the present example, it will be assumed that the result set includes values of Sales Target Revenue for eight Regions. Accordingly, the result set includes eight data points, with each data point being defined by the measure Sales Target Revenue and a respective value of the Region dimension.

All comments associated with the determined data points of the result set are determined at S940. According to some embodiments, the aforementioned data structures storing data points are searched at S940 to identify any stored data points of the result set which match the determined data points of the result set.

A visualization of the result set is generated and presented at S950. The visualization includes at least one graphical indicator of one or more of the identified comments. Visualization 1020 is an example of a visualization presented at S950 according to some embodiments. Visualization 1020 is a bar graph including one bar representing a value of Sales Target Revenue for each of the eight regions. Visualization 1020 also includes graphical indicator 1030 representing comments associated with the data points represented in visualization 1020. According to the illustrated embodiment, graphical indicator 1030 indicates that one comments is associated with the data points represented in visualization 1020.

Figure 11:
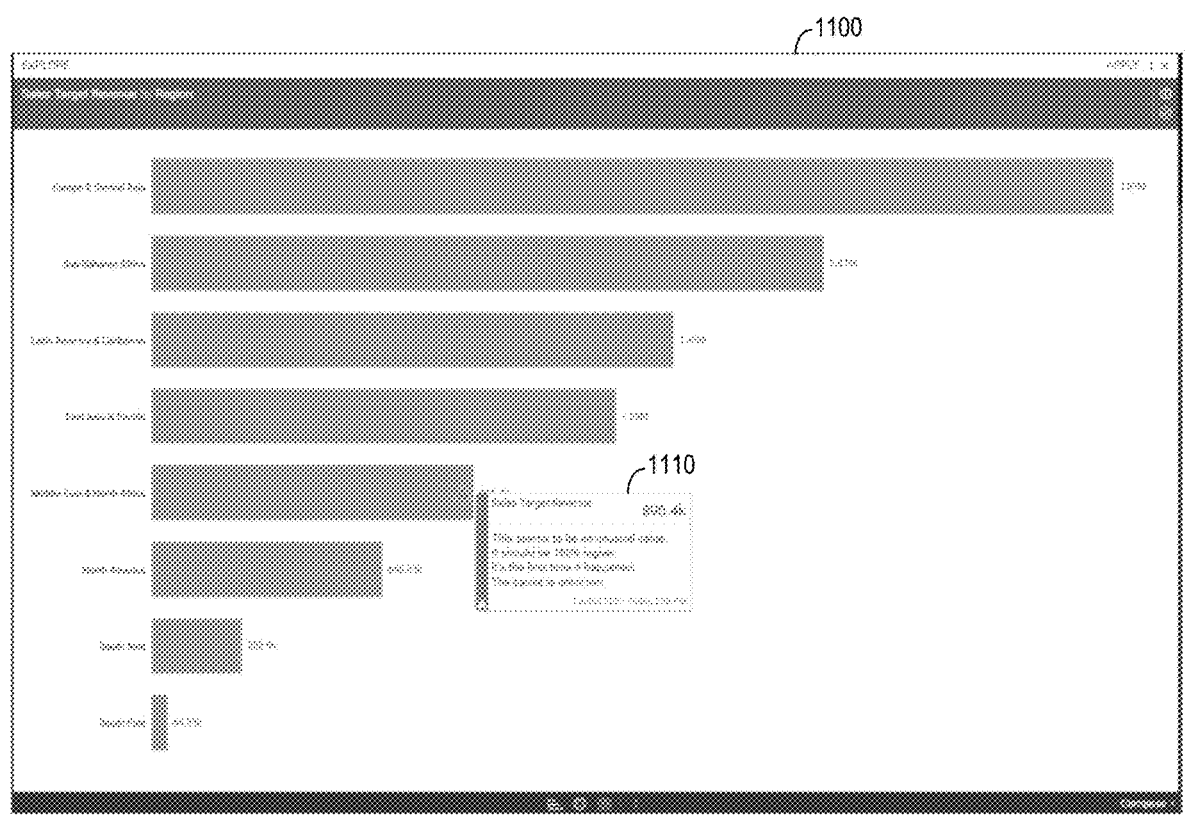
FIG. 11 is an outward view of a user interface according to some embodiments.

In some embodiments, graphical indicator 1030 and/or visualization 1020 is selectable to explore visualization 1020 as shown in FIG. 11. Interface 1100 is similar to interface 400 of FIG. 4, and includes indicator 1110 of the identified one comment. Indicator 1110 presents further detail of the comment and is positioned in conjunction with the graphical visualization of its corresponding data point (i.e., Sales Target Revenue, Region: Middle East and North Africa). Embodiments are not limited to the appearance, position or content of graphical indicators 1030 and 1110.

Figure 12:
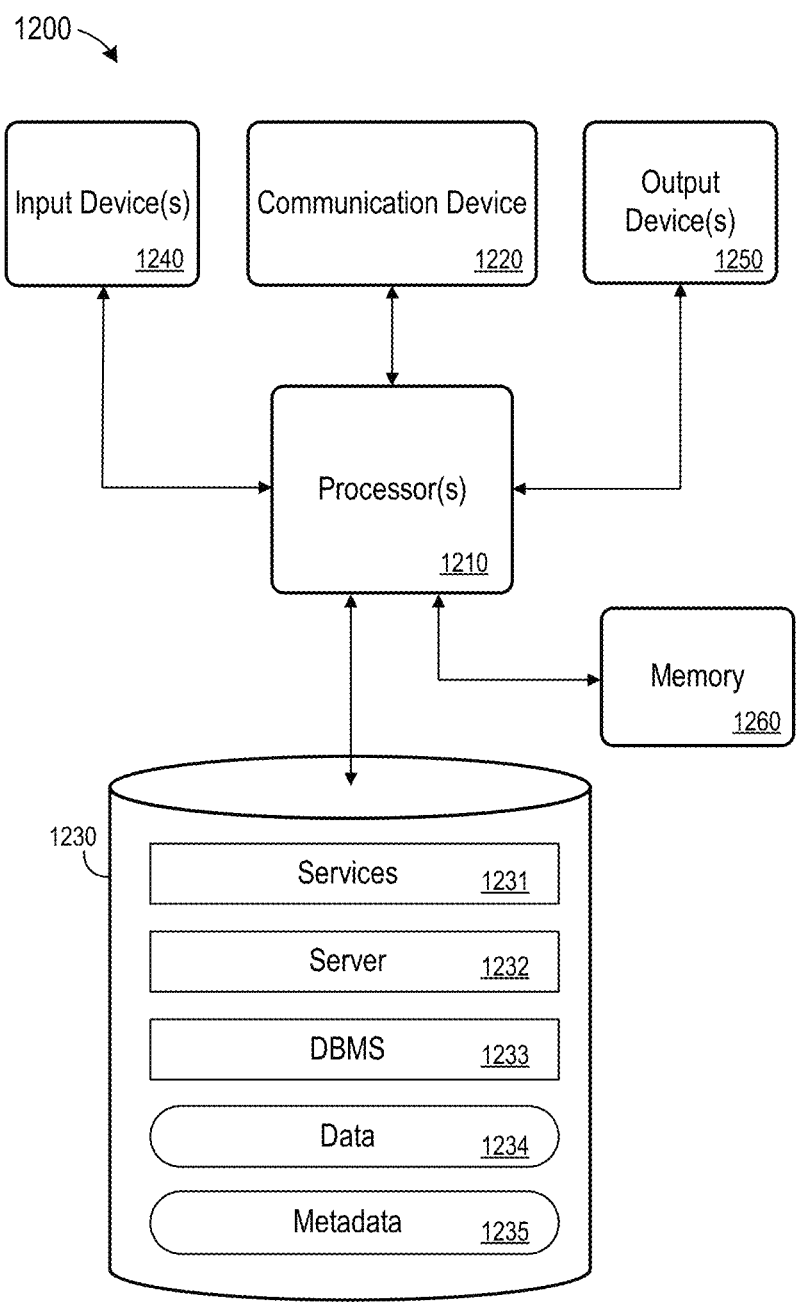
FIG. 12 is a block diagram of an apparatus according to some embodiments.

FIG. 12 is a block diagram of apparatus 1200 according to some embodiments. Apparatus 1200 may comprise a general-purpose computing apparatus and may execute program code to perform any of the functions described herein. Apparatus 1200 may comprise an implementation of server 130, DBMS 120 and data store 110 of FIG. 1 in some embodiments. Apparatus 1200 may include other unshown elements according to some embodiments.

Apparatus 1200 includes processor 1210 operatively coupled to communication device 1220, data storage device 1230, one or more input devices 1240, one or more output devices 1250 and memory 1260. Communication device 1220 may facilitate communication with external devices, such as a reporting client, or a data storage device. Input device(s) 1240 may comprise, for example, a keyboard, a keypad, a mouse or other pointing device, a microphone, knob or a switch, an infra-red (IR) port, a docking station, and/or a touch screen. Input device(s) 1240 may be used, for example, to enter information into apparatus 1200. Output device(s) 1250 may comprise, for example, a display (e.g., a display screen) a speaker, and/or a printer.

Data storage device 1230 may comprise any appropriate persistent storage device, including combinations of magnetic storage devices (e.g., magnetic tape, hard disk drives and flash memory), optical storage devices, Read Only Memory (ROM) devices, etc., while memory 1260 may comprise Random Access Memory (RAM), Storage Class Memory (SCM) or any other fast-access memory.

Services 1231, server 1232 and DBMS 1233 may comprise program code executed by processor 1210 to cause apparatus 1200 to perform any one or more of the processes described herein. Embodiments are not limited to execution of these processes by a single apparatus.

Data 1234 and metadata 1235 (either cached or a full database) may be stored in volatile memory such as memory 1260. Data 1234 may include enterprise data including data structures storing data points and associated comments as described above. Metadata 1235 may include information regarding dimension names, dimension hierarchies, and measure names. Data storage device 1230 may also store data and other program code for providing additional functionality and/or which are necessary for operation of apparatus 1200, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
a memory storing processor-executable process steps;
a display to present a visualization of a result set, the visualization including a plurality of graphical representations, each of the plurality of graphical representations associated with a respective data point comprising at least one dimension value and at least one measure of the result set; and
a processor to execute the processor-executable process steps to cause the system to:
receive a selection of a first data point of the plurality of data points;
receive a first one or more comments, wherein reception of the first one or more comments comprises:
presentation of a first question;
reception of a first answer to the first question;
generation of a first one or more comments in a comment box based on the first answer, wherein the first one or more comments is the first answer and the first answer is absent from the comment box prior to generation of the first answer in the comment box;
determination, via the processor, of a second question to present in the visualization in response to the first answer, wherein the determination is based on a content of the first answer and the second question is absent on the visualization prior to the determination of the second question; and
presentation in the visualization of the determined second question in response to the generation of the first answer in the comment box in the visualization, wherein the second question is presented while maintaining the presentation of the first question; and
in response to reception of a last comment of the one or more comments:
determine whether a data point structure having identical at least one dimension value and at least one measure exists in a storage and store the one

9 or more comments in the data point structure in a case that it is determined the data point structure exists, create a data point structure in a case that it is determined the data point structure does not exist, store the one or more comments in the created data point structure; and store an identifier of the first data point in association with the first one or more comments, wherein the identifier identifies the first one or more comments associated with the data point in the visualization;

wherein the display is to present an interface to receive the first one or more comments in response to selection of the first data point.

2. The system according to claim 1, further comprising process steps to cause the system to:

receive a second answer to the second question; and generate a second one of the one or more comments based on the second answer, wherein the second one of the one or more comments is the second answer, and wherein the comment box is updated to include the second answer while maintaining the first answer.

3. The system according to claim 1, wherein reception of a selection of the first data point of the plurality of data points comprises reception of a selection of a first of the plurality of graphical representations associated with the first data point.

4. The system according to claim 3, wherein reception of the first one or more comments further comprises:

receiving a second answer to the second question; and generating a second one of the one or more comments based on the second answer.

5. The system according to claim 4, the processor to further execute the processor-executable process steps to cause the system to:

receive a query;

generate a second result set associated with the received query;

determine a second plurality of data points of the result set, each of the second plurality of data points comprising at least one dimension value and at least one measure of the result set;

identify identifiers of one or more of the second plurality of data points stored in association with one or more comments, the identified identifiers including the first identifier; and generate a second visualization of the second result set, the second visualization including a one or more graphical indicators representing the one or more comments associated with the second plurality of data points.

6. The system according to claim 1, the processor to further execute the processor-executable process steps to cause the system to:

receive a query;

generate a second result set associated with the received query;

determine a second plurality of data points of the result set, each of the second plurality of data points comprising at least one dimension value and at least one measure of the result set;

identify identifiers of one or more of the second plurality of data points stored in association with one or more comments, the identified identifiers including the first identifier; and generate a second visualization of the second result set, the second visualization including a one or more

10 graphical indicators representing the one or more comments associated with the second plurality of data points.

7. The system according to claim 1, the processor to further execute the processor-executable process steps to cause the system to:

receive a second selection of a second data point of the plurality of data points;

receive a second one or more comments; and in response to reception of the second one or more comments, store a second identifier of the second data point in association with the second one or more comments.

8. The system according to claim 7, the processor to further execute the processor-executable process steps to cause the system to:

receive a query;

generate a second result set associated with the received query;

determine a second plurality of data points of the result set, each of the second plurality of data points comprising at least one dimension value and at least one measure of the result set;

identify identifiers of one or more of the second plurality of data points stored in association with one or more comments, the identified identifiers including the first identifier and the second identifier; and generate a second visualization of the second result set, the second visualization including a one or more graphical indicators representing the one or more comments associated with the second plurality of data points.

9. The system according to claim 1, the display to present a second visualization of a second result set, the second visualization including a second plurality of graphical representations, each of the second plurality of graphical representations associated with a respective data point comprising at least one dimension value and at least one measure of the result set, and the processor to execute the processor-executable process steps to cause the system to:

receive a selection of the first data point;

receive a second one or more comments; and in response to reception of the second one or more comments, store the second one or more comments in association with the first identifier of the first data point.

10. The system according to claim 9, the processor to further execute the processor-executable process steps to cause the system to:

receive a query;

generate a second result set associated with the received query;

determine a second plurality of data points of the result set, each of the second plurality of data points comprising at least one dimension value and at least one measure of the result set;

identify identifiers of one or more of the second plurality of data points stored in association with one or more comments, the identified identifiers including the first identifier; and generate a second visualization of the second result set, the second visualization including a one or more graphical indicators representing the one or more comments associated with the second plurality of data points, the one or more comments associated with the second plurality of data points including the first one or more comments and the second one or more comments.

11. A computer-implemented method comprising:
presenting a visualization of a result set, the visualization including a plurality of graphical representations, each of the plurality of graphical representations associated with a respective data point comprising at least one dimension value and at least one measure of the result set;
receiving a selection of a first data point of the plurality of data points;
presenting an interface, in response to selection of the first data point;
presenting via the interface a first question;
receiving, via the interface, a first answer to the first question;
generating a first one of the one or more comments in a comment box based on the first answer, wherein the first one or more comments is the first answer and the first answer is absent from the comment box prior to generation of the first answer in the comment box;
determining a second question to present in the visualization in response to the first answer, wherein the determination is based on a content of the first answer and the second question is absent on the visualization prior to the determination of the second question;
presenting, via the interface, in the visualization, the determined second question in response to the generation of the first answer in the comment box in the visualization, wherein the second question is presented while maintaining the presentation of the first question; and
in response to receiving a last comment of the one or more comments:
determining whether a data point structure having identical at least one dimension value and at least one measure exists in a storage and storing the one or more comments in the data point structure in a case that it is determined the data point structure exists, and
creating a data point structure in a case that it is determined the data point structure does not exist,
storing the one or more comments in the created data point structure, and
storing an identifier of the first data point in association with the first one or more comments, wherein the identifier identifies the first one or more comments associated with the data point in the visualization.

12. The method according to claim 11, further comprising:
receiving a second answer to the second question; and
generating a second one of the one or more comments based on the second answer, wherein the second one of the one or more comments is the second answer, and wherein the comment box is updated to include the second answer while maintaining the first answer.

13. The method according to claim 11, wherein receiving a selection of the first data point of the plurality of data points comprises receiving a selection of a first of the plurality of graphical representations associated with the first data point.

14. The method according to claim 13, further comprising:
receiving a second answer to the second question; and
generating a second one of the one or more comments based on the second answer, wherein the second one of the one or more comments is the second answer.

15. The method according to claim 11, further comprising:
receiving a query;
generating a second result set associated with the received query;
determining a second plurality of data points of the result set, each of the second plurality of data points comprising at least one dimension value and at least one measure of the result set;
identifying identifiers of one or more of the second plurality of data points stored in association with one or more comments, the identified identifiers including the first identifier; and
presenting a second visualization of the second result set, the second visualization including a one or more graphical indicators representing the one or more comments associated with the second plurality of data points.

16. The method according to claim 11, further comprising:
receiving a second selection of a second data point of the plurality of data points;
receiving a second one or more comments; and
in response to reception of the second one or more comments, storing a second identifier of the second data point in association with the second one or more comments.

17. The method according to claim 16, further comprising:
receiving a query;
generating a second result set associated with the received query;
determining a second plurality of data points of the result set, each of the second plurality of data points comprising at least one dimension value and at least one measure of the result set;
identifying identifiers of one or more of the second plurality of data points stored in association with one or more comments, the identified identifiers including the first identifier and the second identifier; and
presenting a second visualization of the second result set, the second visualization including a one or more graphical indicators representing the one or more comments associated with the second plurality of data points.

18. The method according to claim 11, further comprising
presenting a second visualization of a second result set, the second visualization including a second plurality of graphical representations, each of the second plurality of graphical representations associated with a respective data point comprising at least one dimension value and at least one measure of the result set,
receiving a selection of the first data point;
receiving a second one or more comments; and
in response to reception of the second one or more comments, storing the second one or more comments in association with the first identifier of the first data point.

19. The method according to claim 18, further comprising:
receiving a query;
generating a second result set associated with the received query;
determining a second plurality of data points of the result set, each of the second plurality of data points comprising at least one dimension value and at least one measure of the result set;

identifying identifiers of one or more of the second plurality of data points stored in association with one or more comments, the identified identifiers including the first identifier; and presenting a second visualization of the second result set, the second visualization including a one or more graphical indicators representing the one or more comments associated with the second plurality of data points, the one or more comments associated with the second plurality of data points including the first one or more comments and the second one or more comments.

20. A non-transitory computer-readable medium storing program code, the program code executable by a processor of a computing system to cause the computing system to:

present a visualization of a result set, the visualization including a plurality of graphical representations, each of the plurality of graphical representations associated with a respective data point comprising at least one dimension value and at least one measure of the result set;

receive a selection of a first data point of the plurality of data points;

in response to selection of the first data point, present an interface to receive one or more comments;

receive a first one or more comments via the interface, wherein receipt of the first one or more comments comprises:

presentation of a first question;

receipt of a first answer to the first question;

generation of a first one of the one or more comments in a comment box based on the first answer, wherein the first one or more comments is the first answer and the first answer is absent from the comment box prior to generation of the first answer in the comment box;

determination of a second question to present in the visualization in response to the first answer, wherein the determination is based on a content of the first answer and the second question is absent on the visualization prior to the determination of the second question;

presentation in the visualization of the determined second question in response to the generation of the first answer in the comment box in the visualization, wherein the second question is presented while maintaining the presentation of the first question;

receipt of a second answer to the second question; and generation of a second one of the one or more comments based on the second answer; and in response to receipt of a last comment of the one or more comments:

determination whether a data point structure having identical at least one dimension value and at least one measure exists in a storage and storage of the one or more comments in the data point structure in a case that it is determined the data point structure exists, and creation of a data point structure in a case that it is determined the data point structure does not exist, storage of the one or more comments in the created data point structure; and storage of an identifier of the first data point in association with the first one or more comments wherein the identifier identifies the first one or more comments associated with the data point in the visualization.

21. The system according to claim 1, wherein all comments associated with the first data point are stored together.

* * * * *